United States Patent [19]

Payne

[11] Patent Number: 4,634,842

[45] Date of Patent: Jan. 6, 1987

[54] DIAGNOSTIC TESTING ARRANGEMENT FOR AN ELECTRIC COOKING APPLIANCE INCORPORATING COMMUTATED RELAY SWITCHING CIRCUITS

[75] Inventor: Thomas R. Payne, Louisville, Ky.

[73] Assignee: General Electric Company, Louisville, Ky.

[21] Appl. No.: 687,461

[22] Filed: Dec. 28, 1984

[51] Int. Cl.$^4$ .............................................. H05B 1/02
[52] U.S. Cl. ..................................... 219/486; 219/506; 219/501; 340/516; 340/644; 340/650; 361/3; 361/8
[58] Field of Search ................................. 219/483–486, 219/501, 490, 491, 492, 494, 506, 493, 508, 509; 303/92; 361/3, 8, 13; 340/644, 650, 516

[56] References Cited

U.S. PATENT DOCUMENTS

| | | | |
|---|---|---|---|
| 4,106,820 | 8/1978 | Ruhnau et al. | 303/92 |
| 4,134,025 | 1/1979 | Levin | 307/125 |
| 4,270,808 | 6/1981 | Brearley | 303/92 |
| 4,270,809 | 6/1981 | Ohmori et al. | 303/92 |
| 4,296,449 | 10/1981 | Eichelberger | 361/3 |
| 4,322,769 | 3/1982 | Cooper | 361/88 |
| 4,340,852 | 7/1982 | Togneri | 324/51 |
| 4,340,935 | 7/1982 | Anlauf et al. | 303/92 |
| 4,405,922 | 9/1983 | Nishino | 340/825.36 |
| 4,470,041 | 9/1984 | Sutherland | 340/644 |

Primary Examiner—M. H. Paschall
Attorney, Agent, or Firm—H. Neil Houser; Radford M. Reams

[57] ABSTRACT

A power control and diagnostic arrangement illustratively embodied in an electric range having multiple surface heating units which are selectively coupled to an AC power supply by commutated relay switching circuitry. The commutated relay switching circuitry includes two switching networks. Each network includes a diode commutated master relay serially connected to a pair of pilot relays. Each pilot relay is serially connected to one of the surface units. Timing and control circuitry periodically interrupts operation of the power circuit in a normal mode to operate in a diagnostic mode. In the diagnostic mode the relays are switched in a predetermined sequence to test for a short circuit failure of the master relays or commutated diodes, an open circuit failure of the diodes, an open circuit failure of the master relays, a short circuit failure of the pilot relays and an open circuit failure of any individual pilot relay. Upon detection of a failure of a master relay or diode or a short circuit failure of a pilot relay, the master relay and pilot relays for the switching network containing a failed component are de-energized. A user discernible signal is generated informing the user that a failure has been detected.

10 Claims, 10 Drawing Figures

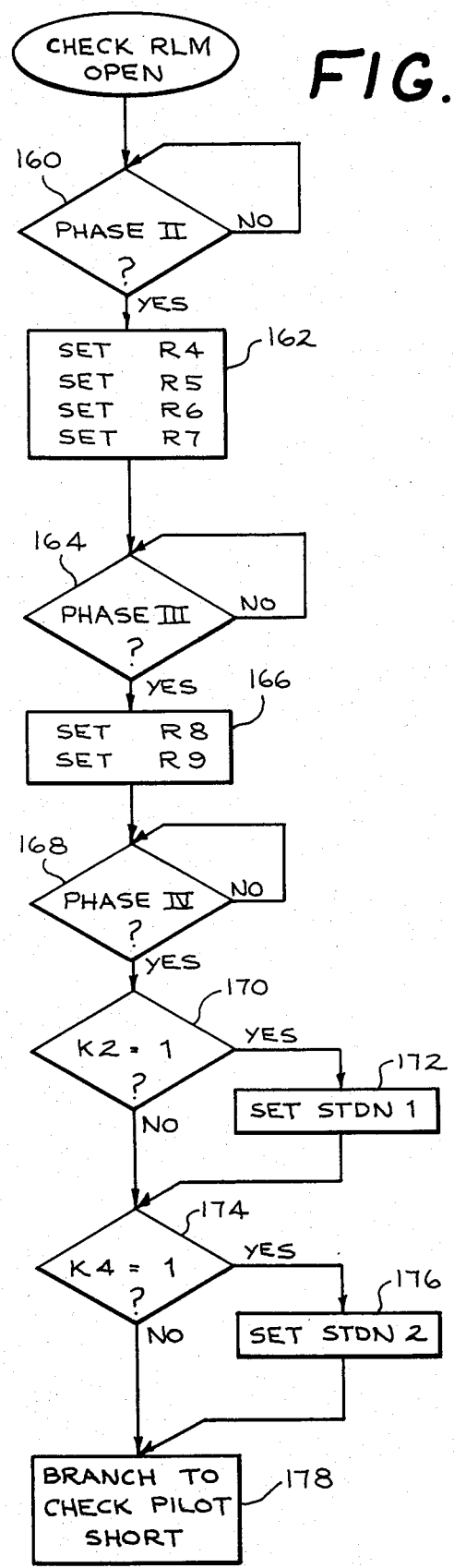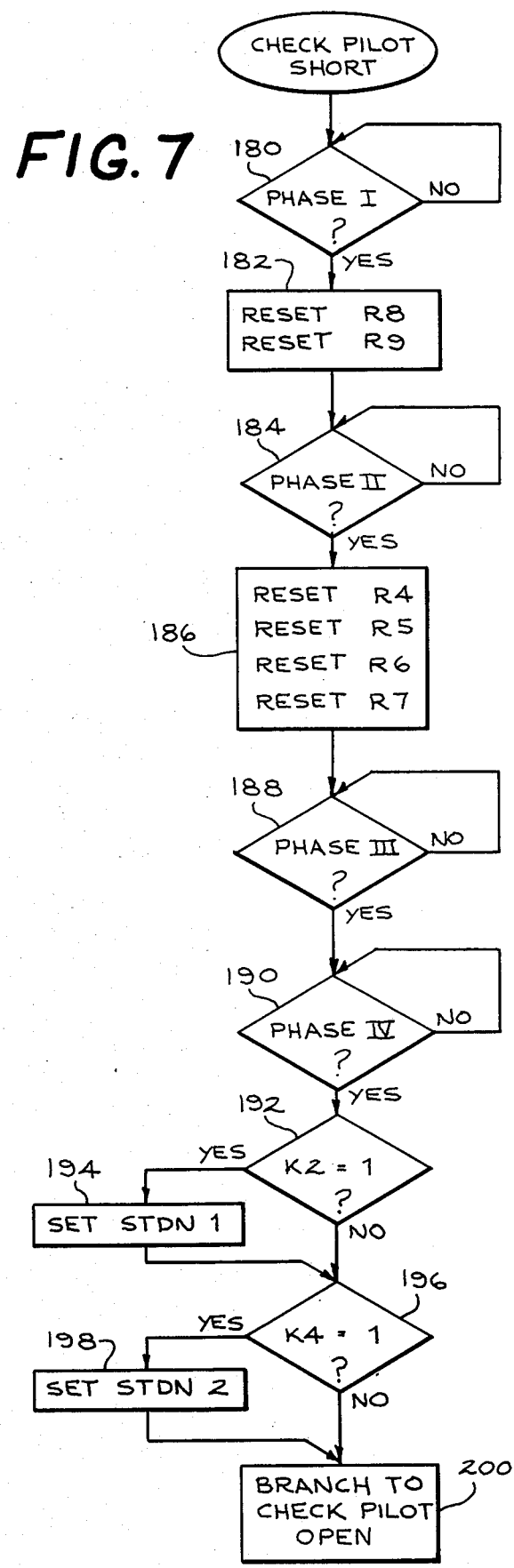

DIAGNOSTIC TESTING ARRANGEMENT FOR AN ELECTRIC COOKING APPLIANCE INCORPORATING COMMUTATED RELAY SWITCHING CIRCUITS

BACKGROUND OF THE INVENTION

The present invention relates generally to diagnostic methods and circuits for commutated relay switching circuitry. More particularly the invention relates to a method and circuits for automatically detecting the failure, either open or closed, of a master relay, commutating diodes, and the pilot relays in a commutated relay switching arrangement.

Conveniently and by way of example the invention may be employed in household cooking appliances incorporating multiple heating units, such as ranges and cooktops. Commonly assigned U.S. Pat. No. 296,449 to Charles W. Eichelberger, discloses a commutated relay switching arrangement which is advantageously used in such cooking appliances. In that arrangeaent each of four surface units is serially connected to the relay contacts of an associated pilot relay. The serially connected pilot relay contacts-surface unit combinations are connected to each other in a parallel array. A single master relay having contacts connected in series with the parallel array couples the array to the power supply. The master relay is shunted by a commutating diode which serves to commutate the current flow through the shunted relay contacts. By opening and closing the master relay during the half-cycle of the AC power signal during which the diode is forward biased the master relay is not subject to substantial power levels during the transition period. The pilot relay contacts are switched during the next occurring half-cycle of AC power signal during which the commutating diode is reverse biased. During this half-cycle substantially no current flows in the pilot relay contacts circuit since the master relay has already been opened during the previous half-cycle and the diode is reverse biased. Consequently, the voltage requirements for the pilot relay are very low and a relatively inexpensive relay may be used as the pilot relay. However, as noted in the Eichelberger patent if the commutating diode operates improperly the life of the master relay contacts will be significantly shortened. Similarly, if the master relay contacts fail closed, the possibility that the pilot relay contacts will fail increases. If both master contacts and pilot contacts fail in a shorted condition the power will be applied to the associated load when not desired.

To address these problems Eichelberger provides fail safe circuitry to perform two tests on the commutating circuitry. The first test determines if the master relay is working, and the second determines if the commutating diode is intact. Each test is performed during the latter half of the positive half-cycle of the power signal after the appropriate master relay contacts have been opened but before the appropriate pilot relay contacts have been changed. If at the end of the test half cycle it is determined that the master relay contacts have failed closed or the commutating diode has failed open, the switching cycle is aborted and no change is made to the state of any of the pilot relay contacts. The microprocessor may also generate an alarm which indicates the system is working improperly and should be shut off and/or repaired.

An additional protective feature is provided in the form of a slow blow fuse connected in series with the commutating diode. If for any reason the master relay contacts are not closed for a long period of time while any one or more of the pilot relays remains closed, the slow blow fuse will open and power will be removed from the load.

While the diagnostic and protective features disclosed by Eichelberger provide significant protection, there are inherent limitations. For example, the state of the pilot relays when the tests are performed is unpredictable and certain states, such as the state where all pilot relays are open at the time the master relay is to be switched, may provide misleading test results, resulting in unnecessarily aborting the switching cycle. Also, the testing does not diagnose failure of the master relay in the open mode, that is failure to close properly. Instead a fuse is employed which adds extra cost and complexity to the power circuit. Furthermore, no provision is made for testing the pilot relays for failure in either the open or the closed mode. Finally, failure of the master relay or diode adversely affects all four surface units.

It would be highly desirable therefore to provide power control switching and diagnostic circuitry which reliably detects master relay, commutating diode, and pilot relay failures in either a short mode or an open mode, and which is further operative upon detection of failure of any of these components in the short mode, or master relay or diode failures in the open mode to de-energize only that portion of the control circuit affected by the failed component and to provide a user discernible signal indicating that such failure has been detected while permitting normal operation of that portion not affected by the failure. It would be further desirable to provide a switching circuit in which a single failure of a master relay or commutating diode does not affect all of the surface units.

It is therefore an object of the present invention to provide power control and diagnostic circuitry which automatically periodically tests for either master relay or commutating diode failures in the short mode and which tests for master relay and diode failures in the open mode and finally which tests the pilot relays for failure in either the open or closed mode.

It is another object to provide circuitry of the aforementioned type which is operative upon detection of a failure of any of the relay or diode components in the short mode to de-energize those surface units affected by the failure and provide a user discernible signal informing the user that such a failure has been detected.

It is yet another object of the present invention to provide circuitry of the aforementioned type which provides a user discernible signal in the event one or more of the pilot relays fails in the open mode which signal informs the user which one of the surface units has failed in that mode, without affecting normal operation of the remaining surface units.

SUMMARY OF THE INVENTION

In accordance with a preferred form of the present invention a cooking appliance of the type having a plurality of electric surface heating units is provided with a power control and diagnostic circuit. The surface units are divided into at least two sets, each set comprising at least one surface unit adapted for energization by an external AC power supply. The circuit further includes at least two power switching networks, each associated with a different one of the surface unit sets operative to selectively couple its associated surface unit set to the external power supply. Each switching network comprises a single master relay and a pilot relay for each of the surface units in the set. The contacts of each pilot relay are serially connected to its associated surface unit forming a serial combination. Each such serial combination is connected in parallel with each other such combination in its set to form a parallel array. Each master relay has contacts serially connecting its associated parallel array to the external power supply. A commutating diode is connected in parallel with the relay contacts of each master relay. The circuit further includes timing and control circuitry for controlling the timing and sequence of the opening and closing of the master and pilot relays. Timing and control means is operative in a normal operating mode to control the relay openings and closings in accordance with user selected power settings for the associated surface unit and in a diagnostic mode to control the relay openings and closings in accordance with a predetermined diagnostic testing sequence selected to identify master relay, pilot relay and diode failures and to identify particular failure modes, that is open circuit modes and closed circuit modes. The timing and control circuitry further includes means operative to identify failures of the master relays, pilot relays and diodes and means for de-energizing the master and pilot relay coils in the particular one of the switching networks in which a failure is detected. Display means provides a user discernible signal indicating that a failure has been detected and which surface units are affected by the failure.

BRIEF DESCRIPTION OF THE DRAWINGS

FIGS. 5-9 are flow diagrams of the diagnostic routine incorporated in the control program of the microprocessor in the circuit of FIG. 3.

DETAILED DESCRIPTION OF THE INVENTION

While the novel features of the invention are set forth with particularity in the appended claims, the invention both as to organization and content will be better understood and appreciated along with other objects and features thereof from the following detailed description taken in conjunction with the drawings.

Figure 1:
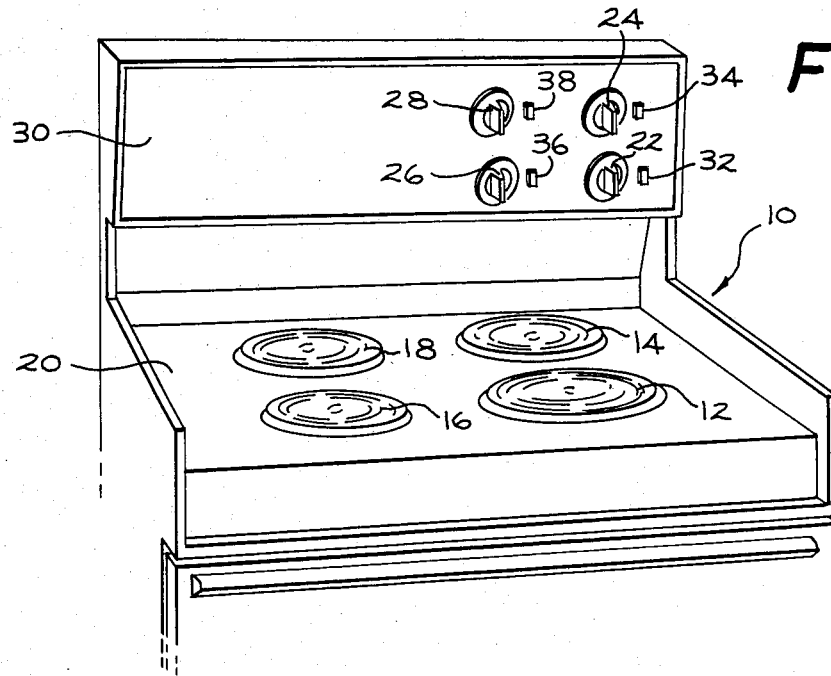
FIG. 1 is a front perspective view of a portion of an electric range illustratively embodying the diagnostic arrangement of the present invention.

Referring now to the drawings wherein identical reference numerals denote similar or corresponding elements throughout the various figures, FIG. 1 shows an electric range 10 incorporating commutated relay switching circuitry in its power control circuit illustratively embodying the present invention. Range 10 includes four conventional electric surface unit resistive heating elements 12, 14, 16 and 18 supported from a substantially horizontal support surface 20. Each of elements 12-18 are adapted to support cooking utensils, such as frying pans, sauce pans, teakettles, etc., placed thereon for heating. Manually operable rotary control knobs 22, 24, 26, and 28 are mounted to control panel 30 to enable the user to select the desired power level for heating elements 12, 14, 16 and 18 respectively in a conventional manner. Indicator lights 32, 34, 36 and 38 mounted to control panel 30 adjacent control knobs 22, 24, 26 and 28 respectively provide a visual indication to the user when energized signifying that a switching circuit failure affecting the associated surface unit has been detected and requires servicing. Energization of these lights is controlled in accordance with the diagnostic testing function to be hereinafter described in greater detail.

Figure 2:
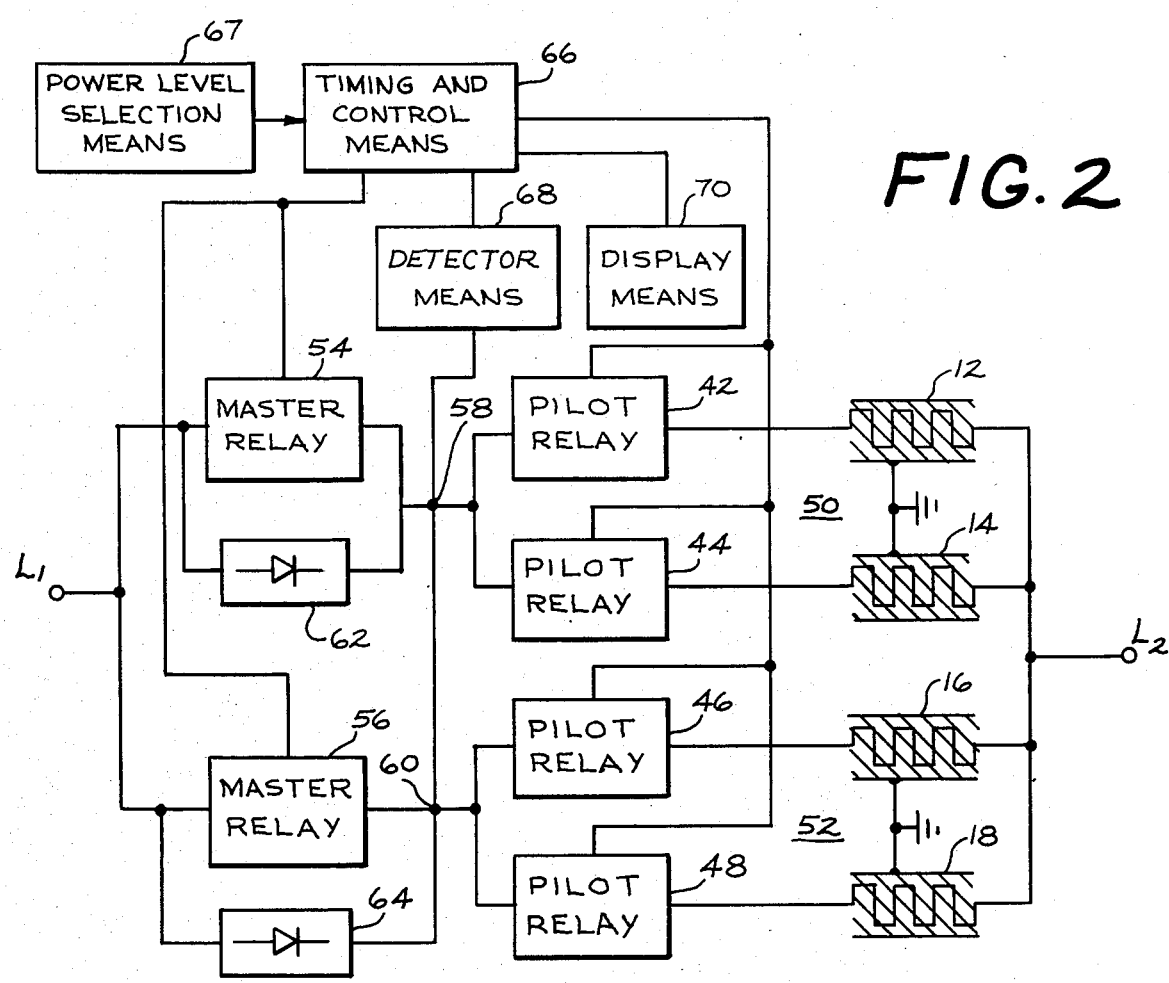
FIG. 2 is a simplified functional block diagram of the power control arrangement for the surface units of the range illustrated in FIG. 1 incorporating the diagnostic arrangement of the present invention.

A generalized functional block diagram of the control circuit for the range of FIG. 1 is shown in FIG. 2. The power control system of FIG. 2 employs a commutated relay scheme generally of the type described in commonly assigned U.S. Pat. No. 4,296,449 to Eichelberger, the disclosure of which is hereby incorporated by reference, which system is modified to employ two master relays, each controlling one set of two surface units.

Surface units 12, 14, 16 and 18 are serially connected to pilot relay contacts designated 42, 44, 46 and 48 respectively. The series combination comprising pilot relay contacts 42 and surface unit 12 is connected in parallel with the series combination comprising relay contacts 44 and surface unit 14 to form a first parallel array designated generally 50. The series combination of relay contacts 46 and surface unit 16 is similarly connected to the series combination comprising relay contacts 48 and surface unit 18 to form a second parallel array designated generally 52. Arrays 50 and 52 are respectively serially connected to master relays 54 and 56, at respective junctions designated 58 and 60. Master relays 54 and 56 couple arrays 50 and 52 respectively power terminal designated L1. The other side of arrays 50 and 52 are coupled to power terminal L2. L1 and L2 are adapted for connection to an external AC power supply such as the conventional 60 Hz, 240 volt domestic power supply. Commutating diodes 62 and 64 are connected in parallel with master relay contacts 54 and 56 respectively. Diodes 62 and 64 when forward biased provide current shunts around their respective master relay contacts.

Master relay contacts 54 together with associated pilot relay contacts 42 and 44 form a first switching network. Master relay contacts 56 together with associated pilot relay contacts 46 and 48 form a second switching network. The commutated switching sequence for each switching network is controlled by timing and control means 66 so as to enable the changing of the state of the master relay and the pilot relays during periods of minimal current flow through the contacts, thereby subjecting the relays to only minimal voltages during such transitions. To this end, when the state of any one of pilot relay contacts 42-48 is to be changed, control means 66 first opens the associated one of master relay contacts 54 and 56 during a positive half-cycle of the power signal (L1 positive relative to L2) during which the associated one of commutating diodes 62 and 64 is forward biased; the state of the pilot relays are changed as necessary during the next occurring negative half-cycle of the voltage signal from the power supply when diode 52 is reverse biased and master relay contacts are open; finally the master relay contacts are re-closed during the next occuring positive half-cycle of the power supply voltage signal.

During operation in the normal operating mode timing and control means 66 implements a duty cycle power control scheme by controlling the percentage of time power is applied to each of the heating elements 12-18 in accordance with the power level setting individually selected for each heating unit by the user via the power level selection means 67. The particular manner of implementing duty cycle control for normal operation forms no part of the present invention and hence will not be described in detail. For a detailed description of the implementation of an applicable duty cycle control arrangement, reference made be had to commonly assigned U.S. Pat. No. 4,465,924 to Thomas R. Payne, which is hereby incorporated by reference.

As noted briefly in the Background discussion, in commutated relay switching arangements improper operation of the commutating diode may significantly shorten the life of the master relay contacts. Similarly, if the master relay contacts fail closed, the life time of the pilot relays may be shortened. If both master contacts and the pilot contacts fail in a shorted condition, power will be applied to the associated heating element when not desired. In addition, failure of the pilot relays in the open mode would prevent energization of the associated surface unit.

In order to minimize the adverse affects of a failure of a master relay or commutating diode in either the open or short failure mode it is desirable to turn off all of the surface units controlled by the failed master relay or associated commutating diode and inform the user that such a fault has occurred. With respect to the failure of one or more of the pilot relays in the open mode, it is likewise desirable to call attention of the user to the existence of the failure, but the nature of the failure is not such as to require that operation of the other surface units be interrupted. Rather it is desirable that the remaining surface units be able to operate normally. A significant advantage in using two master relays in the manner illustrated herein, is that at most only two surface units are affected by a failure of any one component in the switching networks.

As will be hereinafter described, diagnostic circuitry in accordance with the present invention is capable of detecting a failure of the master relays, commutating diodes or pilot relays in the open or short circuit mode, and identifying at least which parallel array contains the failed component. Thus, only the switching network containing the failed component is turned off. The remaining network continues to operate normally.

To implement this diagnostic function timing and control means 66 includes means for periodically interrupting operation in the normal power control mode to initiate operation in a diagnostic mode. When operating in the diagnostic mode timing and control means 66 is operative to switch the master relay contacts 54 and 56 and the pilot relay contacts 42, 44, 46 and 48 to predetermined diagnostic states in a predetermined sequence independently of the power setting being implemented to test for various failure modes of the master relay, commutating diodes and pilot relays. Detection means 68, coupled between timing and control means 66 and the junctions designated 58 and 60, is operative to generate status signals indicative of the voltage level at the junctions 58 and 60. Timing and control means 66 further includes means operative in the diagnostic mode to periodically scan the status signals from detector means 68. For each diagnostic state of the pilot and master relays the state of the status signal signifies either normal operation or a particular component failure.

The sequence of master and pilot relay diagnostic states is selected to enable timing and control means 66 to identify which components failed and in which mode, short circuit or open circuit, the failure occurs. The first test determines whether either a master relay or a commutating diode has failed in a short mode. The next test determines if either of the master relays has failed in an open mode. Next, the diodes are tested for failure in an open mode. The next test determines if one or more of the pilot relays has failed in the short mode. Finally, the pilot relays are individually tested to determine which, if any, of the pilot relays has failed in an open mode.

Upon detection of a failure, display means 70 provides a user discernible signal indicating that a failure has been detected and service is required.

Figure 3:
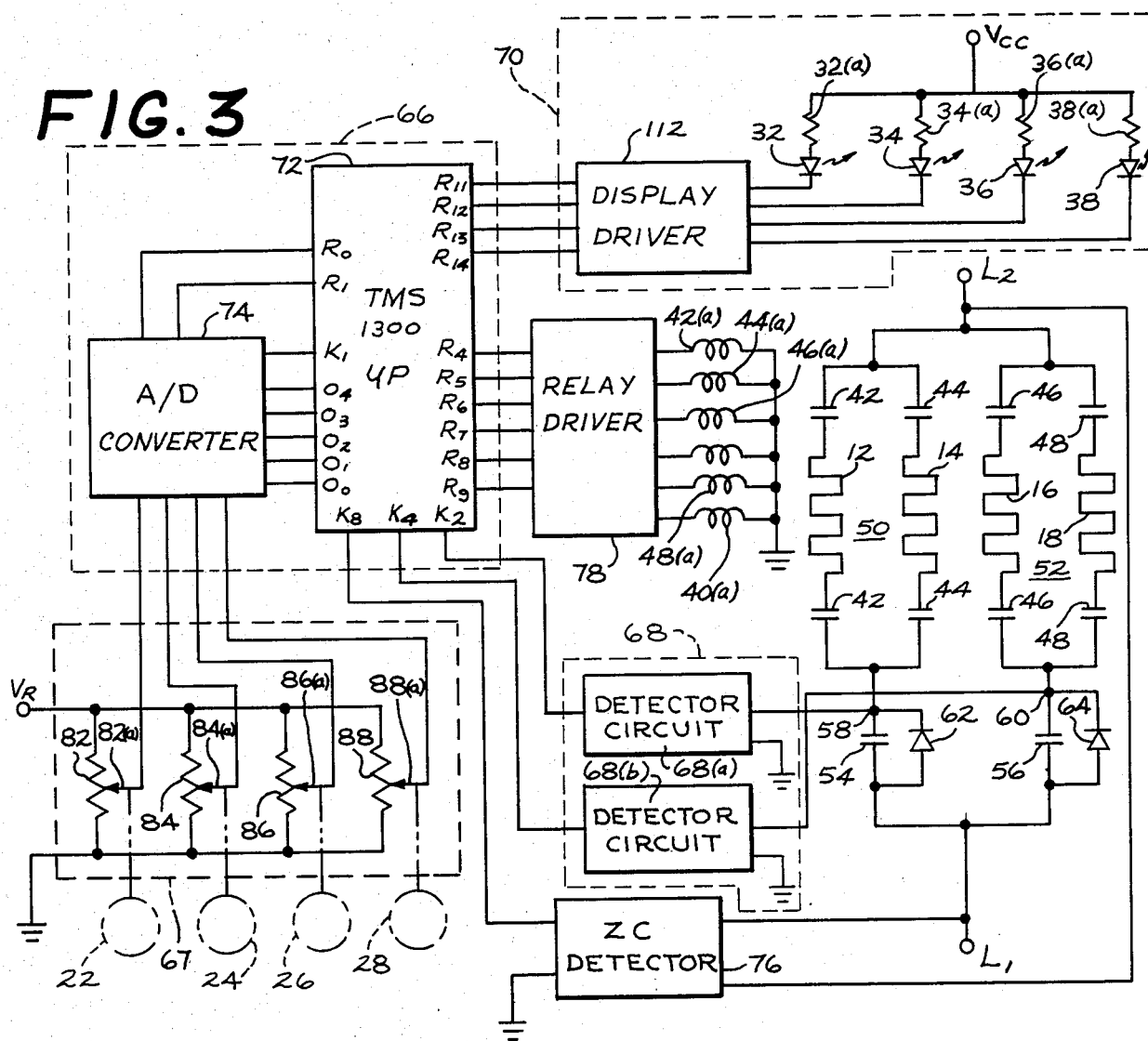
FIG. 3 is a schematic diagram of a microprocessor based control circuit illustratively embodying the diagnostic arrangement of the present invention as embodied in the range of FIG. 1.

Referring now to FIG. 3 there is shown in simplified schematic form the microprocessor based power control and diagnostic circuit of Fig. 2. Power to heating elements 12, 14, 16 and 18 is provided by application of the standard 60 Hz power signal 240 volt across the terminals L1 and L2. Pilot relay contacts 42, 44, 46 and 48 are serially connected to surface units 12, 14, 16 and 18 respectively. Each relay includes two sets of contacts connected to opposite ends of its associated surface unit so that when the contacts are open (relay coil de-energized) the surface unit is completely isolated from the power lines L1 and L2.

A first parallel array of pilot relay contacts/surface units designated 50 comprising surface unit 12 and pilot relay contact 42 in parallel with surface unit 14 and relay contact 44 is connected at one end to power line terminal L2 and at its other end to master relay contacts 54 at junction 58. A second parallel array of surface units and pilot relay contacts and surface units designated 52 is connected at one end to L2 and at the other end to master relay contact 56 at junction 60. Master relay contacts 54 and 56 couple arrays 50 and 52 respectively to L1. Commutating diodes 62 and 64 are connected in parallel with master relay contacts 54 and 56 respectively.

Timing and control means designated generally 66 comprises microprocessor 72 and an associated conventional A/D converter circuit 74. Relay control signals from microprocessor output ports R4-R9 are coupled to relay coils 42(a), 44(a), 46(a), 48(a), 54(a) and 56(a) respectively, which control relay contacts 42, 44, 46, 48, 54 and 56 respectively by a conventional relay driver circuit network 78.

A 60 Hz signal is generated by a conventional zero crossing detector circuit 76 and applied to microprocessor input port K8 for purposes of synchronizing system operation with zero crossings of the power signal applied across terminals L1 and L2. The signal applied to port K8 is essentially a square wave which oscillates with the 60 Hz power signal, switching between a logic one level when L1 is positive with respect to L2 and a logic zero level when L1 is negative with respect to L2.

Means for enabling the operator to select the desired power level for each heating element is provided by power level selection means designated generally 67, essentially comprising a set of 4 potentiometers 82, 84, 86 and 88 connected in parallel for controlling of surface units 12, 14, 16 and 18 respectively. A regulated DC reference voltage $V_R$ is applied across these potentiometers. Wiper arms 82(a), 84(a), 86(a) and 88(a) for potentiometers 82, 84, 86 and 88 respectively are positioned in accordance with the power settings selected by operator manipulation of a corresponding ones of control knobs 22, 24, 26 and 28. Conventional analog to digital converter circuit 74 scans the setting from each potentiometer to provide digital input signals to microprocessor 72 representing the power level selected for each heating element. Scanning signals are output from microprocessor 72 at output ports $0_0$ thru $0_4$. The power level signal from converter circuit 74 is input to microprocessor 72 at input port K1.

Detector circuits 68(a) and 68(b) are provided to monitor the voltage at the junctions 58 and 60 respectively of the master relay contacts 54 and 56 and the respective parallel array of pilot relay contacts 50 and 52. The output of detector circuits 68(a) and 68(b) are coupled to input ports K2 and K4 respectively of the microprocessor 72. Input ports K2 and K4 are internally scanned during operation in the diagnostic mode as will be hereinafter described.

Figure 3A:
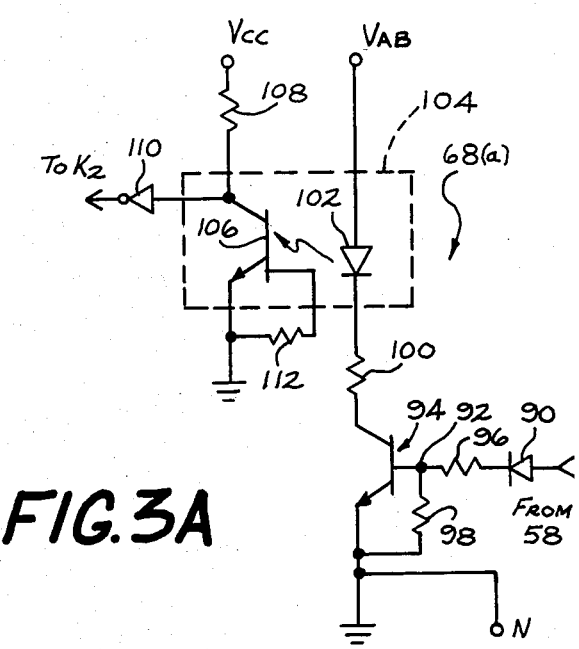
FIG. 3A is a schematic diagram illustrating a portion of the diagram of FIG. 3 in greater detail.

Detection circuit means 68(a) is shown in greater detail in FIG. 3A. It will be appreciated that detection circuit 68(b) may be identically constructed. An isolating diode 90 couples junction 58 to the base terminal 92 of transistor 94 via biasing resistor 96. Biasing resistor 98 is connected between base terminal 92 and the grounded emitter of transistor 94. The emitter of transistor 94 is also coupled to the neutral line, N, from the power supply. Current limiting resistor 100 is connected to the collector of transistor 94. A DC voltage source $V_{AB}$ is coupled to resistor 100 via diode portion 102 of opto-isolator device 104. Opto-isolator 104 includes a transistor device 106 having a grounded emitter and a collector coupled to an isolated voltage supply $V_{CC}$ via resistor 108. The collector of resistor 106 is also coupled to input port K2 of microprocessor 72 via inverter amplifier 110. The base terminal of transistor 106 is connected to its emitter via resistor 112.

In operation when the voltage at junction 58 is positive with respect to neutral, transistor 94 is switched into conduction. Collector current flows through forward biased diode 102 triggering transistor 106 into conduction. The collector voltage for transistor 106 is pulled low causing inverter amplifier 110 to generate a high or logic one signal at input port K2. When the voltage at junction 58 is negative with respect to neutral, transistor 94 is off and no current flows through diode 102. Transistor 106 is non-conductive and the voltage at the collector of the transistor 106 is pulled up to Vcc. This signal is inverted by the inverter amplifier 110 generating a low output or logic zero output signal which is applied to input port K2. The inputs at K2 and K4 are scanned when operating in a diagnostic mode to monitor the operation of the master relay, the commutating diode and the pilot relays.

Display means in the circuit of FIG. 3 comprises LEDs 32, 34, 36 and 38 which are turned on and off by signals at microprocessor output ports R11, R12, R13 and R14 respectively. A dc voltage source $V_{CC}$ is coupled to the anode terminals of diodes 32, 34, 36 and 38 via current limiting resistors 32(a), 34(a), 36(a) and 38(a) respectively. Conventional driver circuitry 112 couples the cathode terminals of LEDs 32, 34, 36 and 38 to ports R11, R12, R13 and R14 respectively.

Waveform A shows the 240 volt power signal applied across L1 and L2. Waveform B represents the voltage between L1 and neutral and waveform C represents the waveform for the voltage power signal between terminal L2 and neutral. The diagnostic test routine is always initiated during a first half cycle of the power signal across L1 and L2 in which the commutating diode is forward biased. The diode is forward biased when L1 is positive with respect to L2. The cycle in which the diagnostic routine is initiated is labeled I in the waveforms of FIG. 4 and will be hereinafter referred to as Phase I. The next succeeding half cycle in which the commutating diode is reverse biased is designated Phase II. The next occurring positive half cycle is designated Phase III and the next occurring negative half cycle is designated Phase IV.

Figure 4:
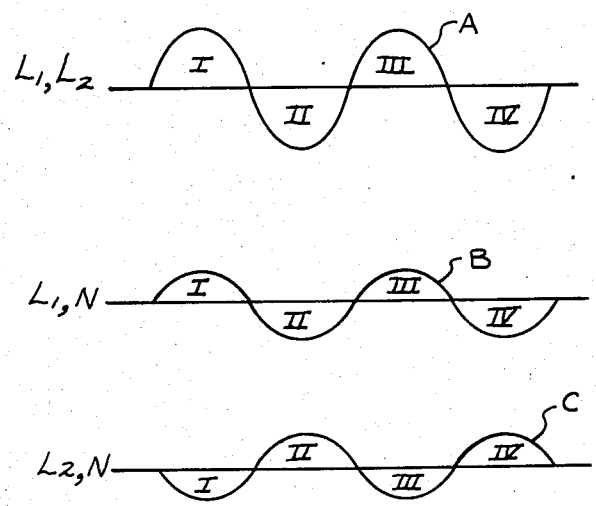
FIG. 4 is a graphical representation of the AC power signal applied to the circuit of FIG. 3.

The switching logic implemented in diagnostic mode will now be described with reference to the circuit of FIGS. 3 and 3A and the power signal waveforms of FIG. 4. At preselected intervals normal operation is interrupted and the diagnostic routine is initiated upon detection of the next occurring positive half cycle defined as Phase I. The system first tests for short circuit failure of the master relays or commutating diodes. During Phase I the master relay contacts are opened. During Phase II all pilot relay contacts are closed. During Phase III the system merely delays and during Phase IV the inputs at ports K2 and K4 are scanned to determine the state of the voltage at the junctions 58 and 60 respectively. Since during Phase IV the voltage at L1 is negative with respect to L2, if the master relay contacts are open and the commutating diodes are operating properly no current is flowing through the surface units and the voltage L2 appears at junctions 58 and 60. L2 during this cycle is positive with respect to neutral and hence assuming that the master relays and diodes are operating properly, a logic low signal is provided to K2 and K4 by detection circuit 68(a) and 68(b) respectively, signifying that both the diodes and the master relay contacts are in effect open circuits and thus operating normally. However, if for example either the master relay contacts 54 or the diode 62 has failed in a short circuit mode, the voltage at the junction 58 will be L1 which is negative with respect to neutral during this cycle. Consequently, input at K2 would be a logic one signifying a short circuit failure of either diode 62 or the master relay contacts 54. A logic one would appear at K4 signifying a similar failure if either master relay contacts 56 or diode 64 failed in the short circuit mode.

The next test determines if either of the commutating diodes has failed in an open circuit mode. While still in Phase IV the pilot relay contacts are all opened. On the next occurring positive half cycle which becomes Phase I, the microprocessor scans input ports K2 and K4 to determine the status of the voltage at the junctions 58 and 60 respectively. With all of the master relay and the pilot relay contacts open during Phase I the voltage at the junction should be essentially L1 which during Phase I is positive with respect to neutral resulting in a logic one at input ports K2 and K4 signifying that diodes 62 and 64 are operating properly. However, if for example diode 62 has failed open, no voltage source would be coupled to junction 58 resulting in a logic zero input at K2 signifying a open circuit failure of diode 62. Similarly, a logic zero at K4 signifies an open circuit failure of diode 64.

The next test checks the master relay contacts for an open circuit failure. During Phase II the pilot relays are all closed. During Phase III the master relay contacts are closed. During Phase IV the inputs at K2 and K4 are scanned. Assuming both master relays closed properly, during Phase IV the voltage at the junctions 58 and 60 will be L1 which is negative with respect to neutral, resulting in a logic zero at K2 and K4 signifying that the master relay contacts have closed properly. However, if for example master relay contacts 54 failed to close during Phase IV the voltage at junction 58 would be L2 which during Phase IV is positive with respect to neutral resulting in a logic one input to K2. A logic one at K4 would signify a similar failure of master relay contacts 56. At this point the testing of the master relay and diode for open and short circuit failures is completed.

It remains to test the pilot relays for proper operation. During the next occurring Phase I the master relay contacts are opened. During Phase II all of the pilot relay contacts are opened. After a delay until Phase IV, inputs at K2 and K4 are scanned to check the status of the voltage at the junctions 58 and 60 respectively. Assuming all of the pilot relays have opened properly, during Phase IV the voltage at the junctions 58 and 60 will be the voltage on L1 which is negative with respect to neutral, resulting in a logic zero applied to K2 and K4. However, if for example at least one of the pilot relays 42 or 44 has failed to open properly resulting in a short circuit failure of the relay contacts, the voltage at junction 58 will be L2 which is now positive with respect to neutral, resulting in a logic one input to K2 signifying at least one of pilot relay contacts 42 and 44 has failed in the short circuit mode. A logic one at K4 signifies that at least one of pilot relay contacts 46 and 48 has failed in the short circuit mode.

In the final test each pilot relay is individually tested for an open circuit failure. While still in Phase IV pilot relay contacts 42 are switched closed. During the next occurring Phase II K2 is scanned. Assuming the relay contacts 42 closed properly the voltage L2 which is positive during this phase with respect to neutral will appear at the junction 58 resulting in a logic one signal being applied to K2. If the relay contacts 42 failed to close, a logic zero is applied to K2 signifying an open circuit failure of the pilot relay 42. While still in Phase II the relay contacts 42 are open and the relay contacts 44 are closed. During the next occurring Phase II K2 is again monitored looking for a logic one signifying proper operation of the relay contacts 44. This sequence is repeated for relay contacts 46 and 48, in similar fashion except that K4 is scanned to check the voltage at junction 60. Upon completion of this test the microprocessor reverts to operation in the normal mode.

If during operation in the diagnostic mode a failure of a master relay or commutating diode in the short or open mode is detected or if a short circuit failure of a pilot relay is detected, the relay coils for the master relay and pilot relays for the parallel array containing the failed component are de-energized and are not energized during operation in the normal mode until the failure is corrected. Also, the associated ones of indicator LEDs 32, 34, 36 and 38 are blinked signifying to the user that a failure has been detected, necessitating that the parallel array be rendered inoperative. The other parallel array continues normal operation.

If an open circuit failure of a pilot relay is detected, the associated indicator LED is energized to signify to the user that the surface unit isn't working. However, the remaining three surface units continue to operate normally.

The component values listed in Table I are believed suitable for use in the circuit of FIGS. 3 and 3A. These values are exemplary only, and are not intended to limit the scope of the claimed invention.

TABLE I

| Fixed Resistors (Ω) | Transistor |
|---|---|
| 32(a), 34(a), 36(a), 38(a) 160 | 94 2N2222 |
| 96 220K | Opto-Isolator |
| 98 27K | 104 H11A10 |
| 100 1K | |
| 108 10K | Op Amp |
| 112 10 M | 110 ULN 2004A |
| Potentiometers (Ω) | Microprocessor |
| 82, 84, 86, 80 0–50K | 72 Texas Instruments TMS 1300 |
| Diodes | Surface Units |
| 62, 64 1N5626 | 12, 14, 16, 18 GE WB 30X218 |
| LEDs | Relays |
| 32, 34, 36, 38 TIL220 | 42, 44, 46, 48 Aromat JC2aJ |
| | 54, 56 Gulf & Western GW3240 |
| | DC Supply Voltages |
| | $V_R$ 15 volts |
| | $V_{CC}$ 5 volts |
| | $V_{AB}$ 9 volts |

CONTROL PROGRAM

Microprocessor 72 is customized to perform the power control and diagnostic functions in accordance with the present invention by permanently configuring the ROM of the microprocessor to implement predetermined control instructions. FIGS. 5–8 are flow diagrams which illustrate the diagnostic routine incorporated in the control program of microprocessor 72 to perform the diagnostic functions in accordance with the present invention. From these diagrams one of ordinary skill in the programming art can prepare a set of instructions in permanent storage in the ROM of microprocessor 72. For the sake of simplicity and brevity the control routines to follow will be described with respect to the diagnostic routine only. It should be understood that in addition to the diagnostic function of the present control arrangement there are control functions to be performed when operating in the normal mode. Examples of such control functions may be found in the hereinbefore referenced U.S. Pat. No. 4,465,924.

Figure 5:
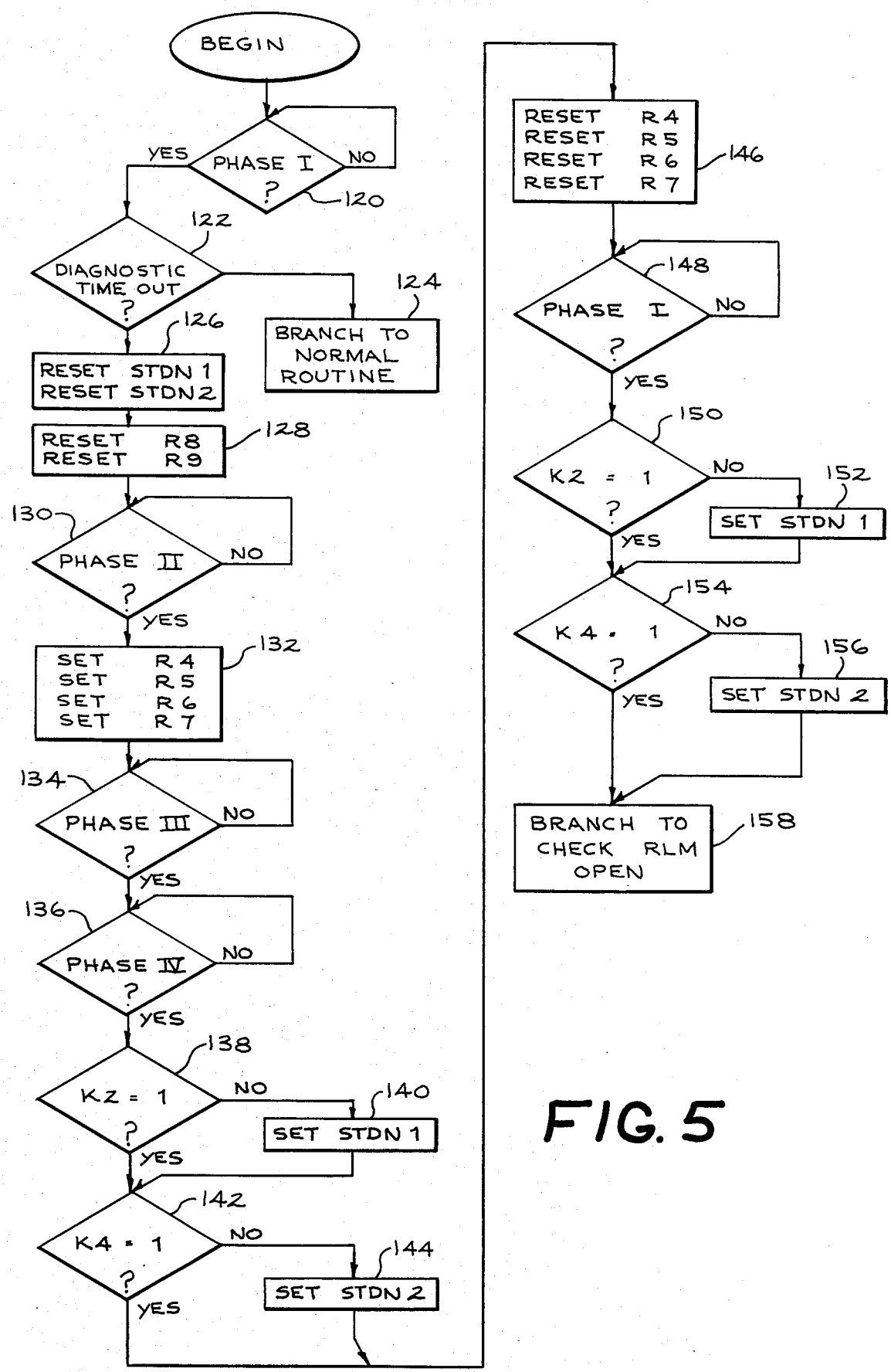

The routine illustrated in FIG. 5 provides for periodic entry into the diagnostic mode at predetermined intervals, and performance of the first and second diagnostic tests, i.e. the test for a short circuit failure of either master relay contacts or commutating diodes, and for an open circuit failure of the commutating diodes. The routine illustrated in FIG. 5 is entered each pass through the control routine. The program delays at Inquiry 120 until the next occurrence of a Phase I, which is signified by a logic one input at K8 from zero crossing detector circuit 76 (FIG. 3). Upon detection of Phase I Inquiry 122 determines if it is time to initiate the next execution of the diagnostic routine. It will be recalled that the diagnostic routine is executed periodically. In the illustrative embodiment the diagnostic routine is to be initiated every 134.4 seconds. The duty cycle period in the illustrative embodiment when operating in the normal mode is 16.8 seconds. 134.4 seconds corresponds to eight duty cycle periods. This time is selected somewhat arbitrarily. The main guidelines are that the time between executions be sufficiently long as to not noticeably affect the duty cycle power control of the heating elements. At the other extreme the time between diagnostic cycles should be short enough that failures are detected reasonably quickly. 134.4 seconds has been found to provide satisfactory results. However, other time periods could be selected as well.

If Inquiry 122 determines that it is not time for the diagnostic cycle, the program branches to the normal power control routine (Block 124). When it is time for a diagnostic cycle to be executed, the cycle is begun while still in Phase I. Latches STDN1 and STDN2, which are used as fault indicators as will be hereinafter described, are reset (Block 126). Next, output ports R8 and R9 are reset (Block 128) thereby de-energizing master relay coils 54(a) and 56(a) to open contacts 54 and 56 respectively. Inquiry 130 then delays the program until the next occurring Phase II of the power signal. Upon detection of Phase II outputs R4–R7 are set (Block 132) thereby energizing pilot relay coils 42(c), 44(c), 46(c) and 48(c), closing all of the pilot relay contacts. The program then delays until the next occurring Phase IV (Inquiries 134 and 136). After a further delay on the order of one millisecond to allow sufficient rise time for the power signal to reach a voltage level preferably on the order of 60 volts to provide reliable triggering of the detection circuitry, Inquiry 138 scans the input at K2. As hereinbefore described, when testing for a short circuit failure of the master relay contacts or the diode, a logic one at K2 during Phase IV signifies that neither master relay contacts 54 nor the diode 62 have experienced a short circuit failure. If K2 is a logic zero, signifying a short circuit failure, a latch designated STDN1 is set (Block 140). Next Inquiry 142 scans input port K4. Similarly, a logic one signifies that neither master relay contacts 56 nor diode 64 have experienced a short circuit failure. If K4 is a logic zero, signifying a short circuit failure, a latch designated STDN2 is set (Block 144). The program then proceeds to test for an open circuit failure of the diodes 62 and 64 by resetting outputs R4–R7 (Block 146) while still in Phase IV, thereby opening each of the pilot relays. Program then delays (Inquiry 148) until the next occurring Phase I. During Phase I, again after a brief rise time delay, the K2 input is again scanned (Inquiry 150) for a logic one. If the input is a logic zero signifying an open circuit failure of diode 62, the STDN1 latch is set (Block 152). A logic one input at K2 at this point signifies that diode 62 is intact. Inquiry 154 similarly scans K4 for a logic one signifying diode 64 is intact. If K4 is a logic zero, STDN2 is set (Block 156). The program then continues (Block 158) to the Check RLM Open Routine (FIG. 6).

The function of the Check RLM Open Routine is to test the master relay contacts for an open circuit failure. Inquiry 160 delays the program until the next occurring Phase II. Upon detection of Phase II the outputs R4–R7 are set (Block 162), closing the pilot relays. The program delays until the next occurring Phase III (Inquiry 164). Outputs R8 and R9 are then set closing the master relay (Block 166). The program delays until detection of the next occurring Phase IV (Inquiry 168). After a brief rise time delay K2 is scanned for a logic one (Inquiry 170), signifying an open circuit failure of master relay contacts 54. If K2 equals one, latch STDN1 is set (Block 172). A logic zero at K2 signifies that the master relay contacts closed properly. Inquiry 174 similarly scans K4. A logic one signifies that master relay contacts 56 failed to close properly and latch STDN2 is set (Block 176). Having completed the tests of the master relays and commutating diodes, the program proceeds (Block 178) to the Check Pilot Short Routine (FIG. 7).

Figure 8:
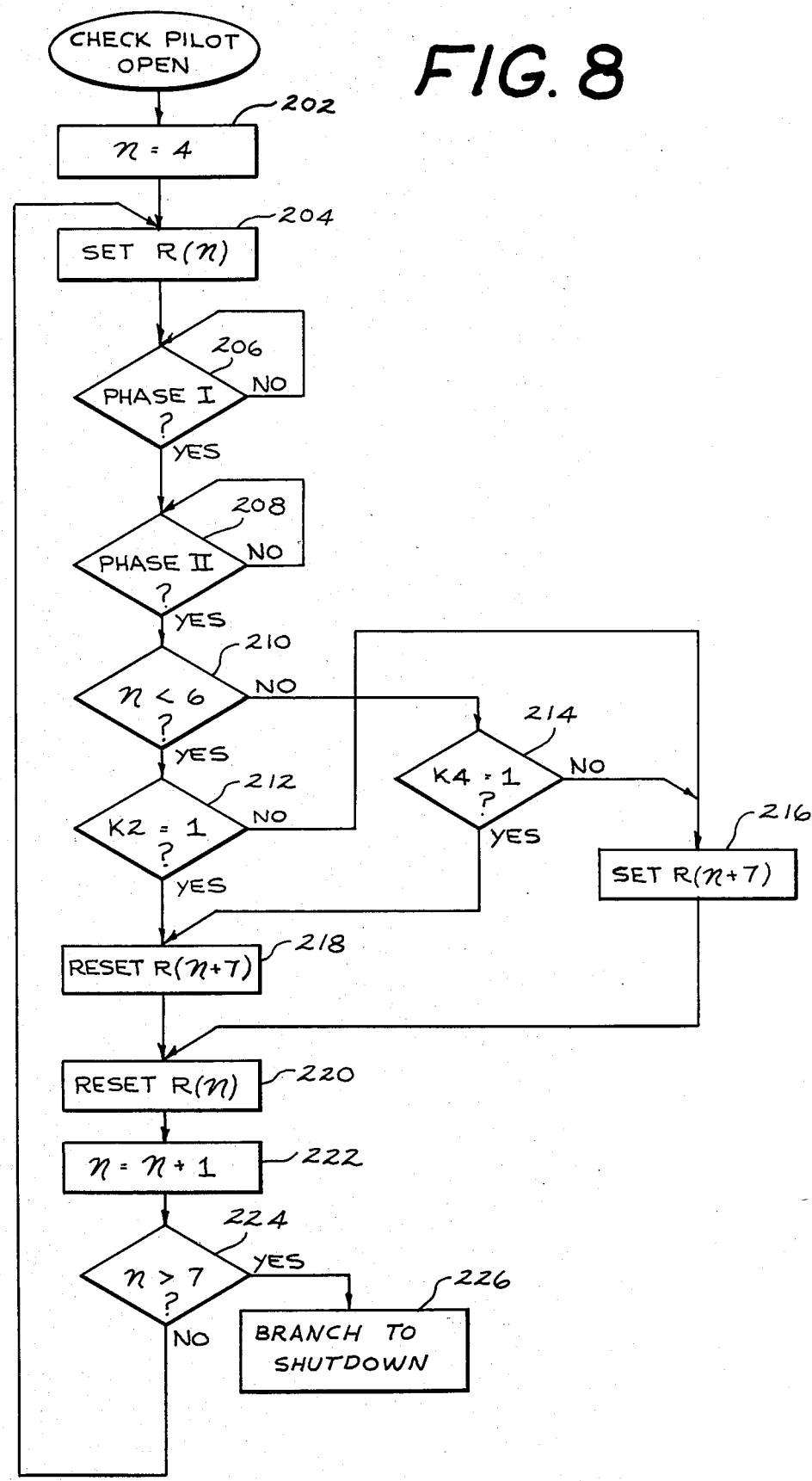

The Check Pilot Short Routine tests for a short circuit failure by any one of the pilot relays. Inquiry 180 delays the program until the next occurring Phase I. Upon detection of the next occurring Phase I outputs R8 and R9 are reset (Block 182), opening the master relay contacts 54 and 56. The program then delays (Inquiry 184) until the next occurring Phase II during which the pilot relays are all opened by resetting outputs R4–R7 (Block 186). The program then delays until the next occurring Phase IV (Inquiries 188 and 190). During the next occurring Phase IV after a brief rise time delay, the input at K2 is again scanned looking for a logic one (Inquiry 192), signifying that at least one of pilot relay contacts 42 and 44 has failed in the short circuit mode. If so, latch STND1 is set (Block 194). A logic zero at K2 signifies that the pilot relay contacts 42 and 44 opened properly. Next, K4 is similarly scanned (Inquiry 196). A logic one at K4 signifying a short circuit failure of one of pilot relay contacts 46 and 48 causes latch STDN2 to be set (Block 198). The program then proceeds (Block 200) to the Check Pilot Open Routine (FIG. 8).

The function of the Check Pilot Open Routine is to test each pilot relay individually for open circuit failures and energize the indicator LEDs when appropriate to indicate open circuit failure of the pilot relays. Since the open circuit failure of a pilot relay inherently de-energizes the associated surface unit, a protective response by the control system is not required. It will be recalled that from the description of the circuit of FIG. 3 that output ports R4–R7 control the switching of pilot relay contacts 42, 44, 46 and 48 respectively by controlling energization of relay coils 42(a), 44(a), 46(a) and 48(a) respectively. Output ports R11–R14 control indicator LEDs 32, 34, 36 and 38 respectively. Hence, setting port R(n) for n=4−7 energizes the appropriate one of pilot relay coils 42(a), 44(a), 46(a) and 48(a). Similarly, setting port R(n+7) energizes appropriate one of LEDs 32, 34, 36 and 38, that is, the LED associated with the surface unit connected to the relay contacts switched by signals at output port R(n).

Figure 9:
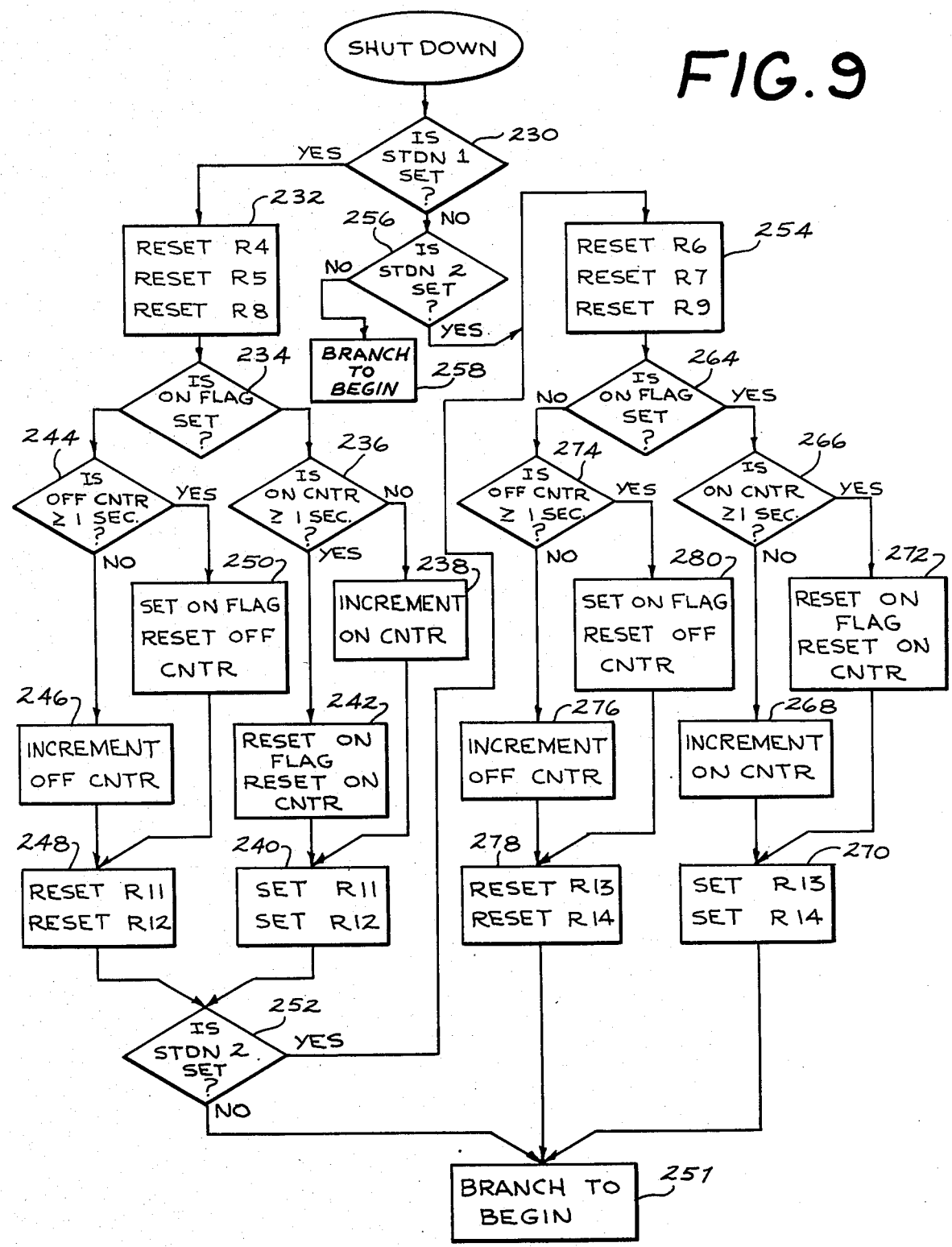

On entering this routine, an index n, used to identify which pilot relay is being tested, is set equal to 4 (Block 202). Output R(n) is set (Block 204) while still in Phase IV to close the pilot relay being tested. The program delays until the next occurring Phase II (Inquiries 206 and 208). Inquiry 210 determines which parallel array is being tested to determine whether to scan K2 or K4. After a brief rise time delay, if n is less than 6, K2 is scanned( Inquiry 212), and if n is greater than 5, K4 is scanned (Inquiry 214). If a logic zero is detected at K2 or K4 signifying that the relay associated with output port R(n) has failed to close, R(n+7) is set (Block 216). A logic one at the appropriate K port causes port R(n+7) to be reset (Block 218). Output port R(n) is then reset (Block 220) and index n is incremented by one (Block 222). This completes the test for one pilot relay. Inquiry 224 determines whether n is greater than 7, signifying that all 4 relays have been tested. If n is less than 7, the program returns to Block 204 to repeat the test for the next pilot relay. If n is greater than 7, program branches (Block 226) to the Shutdown Routine (FIG. 9).

The function of the Shutdown Routine is to provide a user discernible signal indicating that a parallel array of surface units is inoperative due to the detection of a failure necessitating de-energization of the associated relay coils and service is needed. The particular parallel array is identified by blinking the LEDs for the affected parallel array.

It will be recalled that upon detection of an open or short circuit failure of a master relay or commutating diode or a short circuit failure of any one of the pilot relays, a latch designated STDN1 is set if the failure is in array 50 and STDN2 is set if the failure is in array 52. The normal operating routine not described in detail herein includes instructions to override the normal duty cycle control output signals to maintain output ports R4, R5 and R8 in a reset state as long as STDN1 remains set and to maintain output ports R6, R7 and R9 in a reset state as long as STDN2 remains set.

Upon entering this routine Inquirt 230 checks the state of STDN1. If set signifying a failure in array 50, output ports R4, R5 and R8 are reset (Block 232) thereby opening the master relay and each of the pilot relays in array 50. The balance of this branch of the routine causes LEDs 32 and 34 on the control panel to blink on and off at alternate intervals of one second duration. An ON flag and two counters designed ONCNTR and OFFCNTR are used in providing the alternate ON and OFF cycles. When the ON flag is set the indicator lights are to be energized and when it is reset the indicator lights are to be de-energized. Inquiry 234 monitors the state of the ON flag. When set, Inquiry 236 controls the duration of the ON cycle by determining if the ON counter count exceeds the count corresponding to a time duration of one second. If no, ON counter is incremented (Block 238) and the indicator LEDs 32 and 34 are energized by setting the output ports R11 and R12 (Block 240). If the ON cycle has timed out, the ON flag and the ON counter are reset (Block 242) before setting R11 and R12, causing the OFF cycle to be initiated on the next pass through this routine. Returning to Inquiry 234 if the ON flag is reset signifying an OFF cycle in progress, Inquiry 244 determines if the OFF cycle has timed out. If not, the OFF counter is incremented (Block 246), and output ports R11 and R12 are reset (Block 248) preventing energization of LEDs 32 and 34. If Inquiry 244 signifies the OFF counter has timed out, the ON flag is set and the OFF counter is reset (Block 250) before resetting R11 and R12 so that an ON cycle will be initiated on the next pass through this routine. Inquiry 252 determines if STDN2 is set. If not, the program returns (Block 251) to the Begin Routine (FIG. 5). If STDN2 is set, signifying a failure in array 52, the program proceeds to Block 254 to reset outputs R6, R7 and R9 opening master relay contacts 56 and pilot relay contacts 46 and 48.

Returning briefly to Inquiry 230, if STDN1 is not set, Inquiry 256 determines if STDN2 is set. If not, the program returns (Block 258) to the Begin Routine (FIG. 5). If STDN2 is set, R6, R7 and R9 are reset (Block 254). The program then proceeds to execute an LED blinking routine for LEDs 36 and 38 which is identical to that just described for LEDs 32 and 34 except that output ports R13 and R14 are appropriately set (Block 270) and reset (Block 278) at a 1 second rate by Inquiries 264, 266 and 274 which correspond to Inquiries 234, 236 and 244 respectively, and instruction blocks 268, 270, 272, 276, 278 and 280 which correspond functionally to instruction blocks 238, 240, 242, 246, 248 and 250 respectively. Upon completion of the Shutdown Routine the program returns to Begin (FIG. 5). This completes the diagnostic routine.

While the illustrative embodiment blinks the display lights as the indicator means, it will be appreciated that other signal means could be used as well. For example, a conventional annunciator could be used to provide an audible signal in addition to or as an alternative to the blinking lights.

While in the illustrative embodiment hereinbefore described two master relays are employed, it will be appreciated that a single master relay could be employed to couple all four surface units to the AC power supply. The diagnostic mode could be quite similar to that herein described except that all four surface units would need to be rendered inoperative in the event of a failure of the master relay or commutating diode or a short circuit failure of any one of the pilot relays.

While in accordance with the Patent Statutes a specific embodiment of the present invention has been illustrated and described herein it is realized that numerous modifications and changes will occur to those skilled in the art. It is therefore to be understood that the appended claims are intended to cover all such modifications and changes as fall within the true spirit and scope of the invention.

What is claimed is:

1. A power control and diagnostic circuit for an appliance of the type having a plurality of electric heating units and user actuable input means enabling the user to select from a plurality of power settings for each unit, said control and diagnostic circuit comprising:

a plurality of pilot relays, each relay having contacts serially connected to an associated one of the heating units forming a pilot relay/heating unit combination; said pilot relay/heating unit combinations being divided into two or more sets, within each set, said combinations being connected in parallel to form a parallel array for each set.

a master relay associated with each of said parallel arrays, having a set of contacts serially connecting its associated one of said parallel arrays to an external AC power supply;

a commutating diode associated with each master relay operatively coupled in parallel with the contacts of said associated master relay;

timing and control means for controlling switching of said master and pilot relays during operation in a normal mode to control the output power of said heating units in accordance with user selected power settings, said timing and control means including means for periodically interrupting operation in the normal mode for operation in a diagnostic mode in which said master relays and pilot relays are switched to predetermined states, independently of the user selected power settings, in a predetermined switching sequence selected to separately test said master relays, diodes and pilot relays respectively for failure to operate properly;

said timing and control means including means for monitoring the voltage at the junction of said master relay contacts and said pilot relay contacts to detect failures of said master relays, pilot relays and diodes, and means operative in response to detection of a failure, to de-energize said master and pilot relays for that one of said parallel arrays in which the failure is detected and to enable said other parallel array arranged to continue normal operation upon completion of the diagnostic mode; and display means responsive to said timing and control means operative to provide a user discernible signal informing the user that a failure has been detected and which of said arrays contains the failure.

2. In an appliance of the type incorporating a plurality of loads selectively coupled to an AC power source by a switching circuit comprising a diode commutated master relay contact serially connected with a parallel array of pilot relay contacts each serially connected to an associated one of the plurality of loads, the improvement comprising:

timing and control means for controlling the timing and sequence of the opening and closing of the master and pilot relays operative in a normal operating mode to control switching of the master and pilot relays in accordance with a user selected power settings and operative in a diagnostic mode to control the switching of the master and pilot relays in accordance with a predetermined diagnostic testing sequence selected to identify master relay, pilot relay and diode failures and to identify particular modes of failure; said timing and control means including means for periodically interrupting operation in the normal mode to enable operation in the diagnostic mode, means operative in the diagnostic mode to identify master relay, pilot relay and diode failures and particular modes of such failures; and means for de-energizing the master and pilot relays upon detection of particular failure modes.

3. The improvement of claim 2 wherein said timing and control means is operative upon detection of a short circuit failure of any one of the master or pilot relays or the diode to de-energize each of the master and pilot relays; means for detecting an open circuit failure of any of the pilot relays; means for generating a user discernible signal identifying which pilot relays have failed in an open circuit mode; said timing and control means being operative to continue normal operation of the surface units for which the pilot relays are operating properly.

4. The improvement of claim 2 further comprising:
display means operative to provide a first user discernible signal indicating that a failure in the short mode has been detected; and a second user discernible signal signifying that a particular one of the pilot relays has failed in the open mode.

5. For an appliance of the type incorporating a plurality of loads selectively coupled to an AC power source by a switching circuit comprising a diode commutated master relay contact and a plurality of pilot relays, each pilot relay having a set of contacts serially connected to an associated load, each serial combination of pilot contacts and load being connected in parallel with the others to form a parallel array, the parallel array being connected in series with the master relay contact, and timing and control means for controlling the timing and sequence of the opening and closing of the master and pilot relay contacts in a normal mode to control the output power of the loads in accordance with user selected power settings; a method for monitoring operation of the master relay, the commutating diode and the pilot relays comprising periodically interrupting operation in the normal mode to implement a diagnostic mode comprising the steps of:

(a) opening the master relay during a first half-cycle of the AC power signal during which the diode is forward biased;

(b) closing each of the pilot relays during the next occurring half-cycle;

(c) sampling the junction voltage at the junction of the master relay contact with the pilot relay contacts during the next occurring half-cycle that the diode is reverse biased to detect a first voltage level signifying that either the master relay or the diode has failed in short circuit mode, or a second voltage level signifying that neither has failed in the short circuit mode;

(d) opening the pilot relays during the same half-cycle as step (c);

(e) sampling the junction voltage during the next occurring half-cycle that the diode is forward biased to detect a first voltage level signifying the diode has failed in an open circuit mode or a second level signifying the diode is operating properly;

(f) closing each of the pilot relays during the next occurring half-cycle during which the diode is reverse biased;

(g) closing the master relay during the next occurring half-cycle;

(h) sampling the junction voltage during the next occurring half-cycle to detect a first level indicative of proper master relay operation or a second level indicative of an open circuit failure of the master relay; and (i) de-energizing the master and pilot relays if a failure of the master relay or commutating diode is detected.

6. The method of claim 5 further comprising the additional steps following step (i) of:

(j) opening the master relay during the next occurring half-cycle in which the diode is forward biased;

(k) opening each of the pilot relays during the next occuring half-cycle;

(l) sampling the junction voltage during the next occurring half-cycle in which the diode is reverse biased to detect a first level signifying all relays opened properly or a second level indicative of at least one of the pilot relays failing in the short circuit mode;

(m) de-energizing the master and pilot relays if the first level is detected.

7. The method of claim 6 further comprising the additional steps following step (m) of:

(n) closing a first one of the pilot relays following the last mentioned sampling step;

(o) sampling the junction voltage during the next occurring half-cycle in which the diode is reverse biased to detect a first level signifying that the first pilot relay has failed to close or a second level signifying that the first pilot relay has closed properly; and (p) if the first level is detected, providing a user discernible signal identifying the malfunctioning pilot relay and repeating steps (n)–(p) until each pilot relay has been individually tested.

8. In an appliance of the type incorporating a plurality of electrical loads selectively coupled to an AC power source for energization by an AC power signal via a switching circuit comprising a diode commutated master relay contact and a plurality of pilot relays, each pilot relay having a set of contacts serially connected to an associated load, each serial combination of pilot contacts and load being connected in parallel with the other serial combinations to form a parallel array, the parallel array being connected in series with the master relay contacts, the improvement comprising:

timing and control means for controlling the timing and sequence of opening and closing the master and pilot relay contacts, said means including voltage sensing means for sampling the junction voltage at the junction of the master relay contact and pilot relay contacts; said timing and control means being operative in a normal operating mode to control switching of the master and pilot relays in accordance with a user selected power setting and operative to periodically interrupt the normal operating mode to control the switching of the master and pilot relays and sampling the junction voltage in accordance with the following predetermined diagnostic switching and sampling sequence selected to identify master relay, pilot relay, and diode failures and to identify particular modes of failures: (a) open the master relay during a first half-cycle of the AC power signal during which the associated conmutating diode is forward biased; (b) close each of the pilot relays during the next occurring half-cycle; (c) sample the junction voltage during the next occurring half-cycle that the diode is reversed biased to detect a first voltage level signifying a short circuit failure of either the master relay or the diode or a second voltage level signifying normal operation of the master relay and diode; (d) open the pilot relays during the next half-cycle in which the diode is reverse biased, (e) sample the junction voltage during the next occurring half-cycle that the diode is forward biased to detect a first voltage level signifying an open circuit failure of the diode or a second level signifying normal diode operation; (f) close each of the pilot relays during the next occurring half-cycle during which the diode is reversed biased; (g) close the master relay during the next occurring half-cycle;

(h) sample the junction voltage during the next occurring half-cycle to detect a first level indicative of proper master relay operation or a second level indicative of an open circuit failure of the master relay; and means for de-energizing the master and pilot relays upon detection of a short circuit or open circuit failure of the master relay or commutating diode.

9. The improvement of claim 8 wherein the diagnostic switching and voltage sampling sequence further includes (i) open the master relay during the next occurring half-cycle in which the diode is forward biased; (j) open each of the pilot relays during the next occurring half-cycle; (k) sample the junction voltage during the next occurring half-cycle in which the diode is reverse biased to detect a first level signifying all relays open properly or a second level indicative of at least one of the pilot relays failing in the short circuit mode;

said means for de-energizing the master and pilot relays being operative to de-energize the master and pilot relays if the second level is detected signifying a short circuit failure of one of the pilot relays.

10. The improvement of claim 9 wherein said timing and control means is further operative to sequentially individually test each pilot relay in accordance with the following switching and voltage sampling sequence: (i) close the pilot relay contacts for the relay under test during the next half-cycle in which the diode is reverse biased; (ii) during the next half-cycle in which the diode is reverse biased sample the junction voltage to detect an open circuit failure, then open the pilot relay under test and close the next pilot relay to be tested; and wherein said timing and control means further comprises means for generating a user discernible signal upon detection of an open circuit failure identifying the surface unit associated with the failed relay.

* * * * *